United States Patent
Rached et al.

(10) Patent No.: US 7,317,933 B2
(45) Date of Patent: Jan. 8, 2008

(54) METHOD FOR MEASURING THE TIME OF ARRIVAL OF A RADIO SIGNAL, RECEIVER AND SYSTEM TO CARRY OUT THE METHOD

(75) Inventors: Nidham Ben Rached, Paris (FR); Thierry Lucidarme, Montigny-le-Bretonneux (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 316 days.

(21) Appl. No.: 10/878,501

(22) Filed: Jun. 28, 2004

(65) Prior Publication Data

US 2005/0014516 A1    Jan. 20, 2005

(30) Foreign Application Priority Data

Jul. 4, 2003    (FR)    ................................. 03 08198

(51) Int. Cl.
*H04M 1/00*    (2006.01)

(52) U.S. Cl. .................... 455/556.1; 455/560; 455/561; 342/359.09; 370/391; 375/149

(58) Field of Classification Search ............. 455/556.1, 455/560, 561, 76; 342/356, 357.09, 357.1, 342/357.12, 357.15; 378/389, 391, 563, 378/504, 505, 506; 375/141, 144, 147, 149

See application file for complete search history.

(56) References Cited

U.S. PATENT DOCUMENTS

| | | | |
|---|---|---|---|
| 5,835,530 A | * | 11/1998 | Hawkes ....................... 375/225 |
| 5,890,068 A | | 3/1999 | Fattouche et al. |
| 6,256,494 B1 | | 7/2001 | Lopes et al. |
| 6,266,534 B1 | | 7/2001 | Raith et al. |
| 6,346,911 B1 | * | 2/2002 | King ..................... 342/357.06 |
| 6,665,332 B1 | | 12/2003 | Carlson et al. |
| 2002/0057730 A1 | * | 5/2002 | Karlsson et al. ............ 375/152 |
| 2002/0098852 A1 | * | 7/2002 | Goren et al. ................ 455/456 |
| 2002/0149518 A1 | | 10/2002 | Haataja et al. |
| 2003/0185242 A1 | * | 10/2003 | Lee et al. ................... 370/491 |
| 2004/0041728 A1 | * | 3/2004 | Bromley et al. ........ 342/357.12 |

FOREIGN PATENT DOCUMENTS

FR    2 777 408    10/1999

(Continued)

OTHER PUBLICATIONS

Technical Specification 3G TS 25.305, <<Stage 2 functional specification of UE positioning in UTRAN>>, Version 3.8.0 published in Mar. 2002 by the 3GPP.

(Continued)

*Primary Examiner*—Edward F. Urban
*Assistant Examiner*—Nhan T. Le
(74) *Attorney, Agent, or Firm*—Trop, Pruner & Hu, P.C.

(57) ABSTRACT

The method measures the time of arrival at a radiocommunication receiver of a received radio signal originating from a transmitting station. A received signal component is stored in a memory of the receiver. An estimation of the information bits carried by the signal component is obtained through demodulation of the signal component by the receiver. The estimation of the time of arrival of the signal is carried out on the basis of the bits thus estimated and the received signal component.

20 Claims, 3 Drawing Sheets

FOREIGN PATENT DOCUMENTS

| FR | 1 235 076 | 8/2002 |
|---|---|---|
| WO | WO 98/32297 | 7/1998 |
| WO | WO 03/009613 | 1/2003 |

OTHER PUBLICATIONS

Technical Specification 3GPP TS 43.051, <<GSM/EDGE Radio Access Network (GERAN), Overall Description—Stage 2 (Release 4) >>, Version 4.0.0, published in Nov. 2000 by the 3GPP.

Technical Specification ETSI TS 101 350, <<Digital cellular telecommunications system (Phase 2+); General Packet Radio Service (GPRS); Overall description of the GPRS radio interface; Stage 2 (GSM 03.64, Version 8.5.0, Release 1999), published by ETSI (European Telecommunications Standards Institute) in Aug. 2000.

Technical Specification 3GPP TS 43.059, <<Technical Specification Group GSM/EDGE Radio Access Network ; Functional stage 2 description of Location Services (LCS) in GERAN (Release 6)>>, Version 6.0.0, published by the 3GPP, Apr. 2003.

* cited by examiner

US 7,317,933 B2

METHOD FOR MEASURING THE TIME OF ARRIVAL OF A RADIO SIGNAL, RECEIVER AND SYSTEM TO CARRY OUT THE METHOD

BACKGROUND OF THE INVENTION

The present invention relates to the field of radiocommunication with mobile stations. It is applied in particular in mobile station locating systems.

The mobile station locating function of a radiocommunication system consists in estimating the geographical position of a given mobile station, in particular on the basis of the signals which it exchanges over the air interface with a radiocommunication infrastructure. This function has undergone recent developments to take account of the need to locate with accuracy a mobile station whose user is making an emergency call. Thus, there are different locating strategies, some of which (the "cell ID" method, OTDOA ("Observed Time Difference Of Arrival"), location method using the GPS system ("Global Positioning System")) are described in particular in the technical specification 3G TS 25.305, "Stage 2 functional specification of UE positioning in UTRAN", version 3.8.0 published in March 2002 by the 3GPP ("3rd Generation Partnership Project"), and in the reference work "Principes de radiocommunication de troisième génération" ["*Third-generation radiocommunication principles*"] by M. Lucidarme, ed. Vuibert, 2002.

FIG. 1 illustrates the access network architecture envisaged for the location function in the context of GSM/GPRS networks for a GERAN-type network, a general description of which is provided in technical specification 3GPP TS 43.051, "GSM/EDGE Radio Access Network (GERAN), Overall Description—Stage 2 (Release 4)", version 4.0.0, published in November 2000 by the 3GPP.

The GERAN network shown in FIG. 1 is built on a GSM infrastructure, and is conventionally divided into a core network (20) and a radio access network, also referred to as the BSS ("Base Station Subsystem").

A general description of the radio interface, referred to as Um, between the mobile stations (MS) 23 and the base stations (BTS) 22 of the BSS is provided in technical specification ETSI TS 101 350, "Digital cellular telecommunications system (Phase 2+); General Packet Radio Service (GPRS); Overall description of the GPRS radio interface; Stage 2 (GSM 03.64, version 8.5.0, Release 1999), published by ETSI (European Telecommunications Standards Institute) in August 2000.

Each base station 22 is supervised by a base station controller (BSC) 21 via an interface known as Abis.

Different location methods are standardized for the GERAN network: the Timing Advance method, the E-OTD ("Enhanced Observed Time Difference") positioning mechanism, the location method using the GPS system, and the U-TDOA ("Uplink Time Difference of Arrival") method. FIG. 1 shows the functional entities of the location service which allow these different methods to be carried out. The GERAN network thus comprises location measurement units (hereafter referred to as LMU) 25a, 25b, which are respectively associated with BSCs, for which they carry out location-related measurements and processing. The figure shows two remote LMU-As 25a, 25c which operate autonomously and communicate with their associated BSC via an interface referred to as Um, and the Abis interface, while the LMU-B 25b, integrated in a base station 22, communicates with its associated BSC via the Abis interface. An entity 26 referred to as the SMLC ("Serving Mobile Location Centre") is also provided to manage the location function. The placing of the SMLC function within the BSS is not standardized, so that an SMLC may be an autonomous network element of the GERAN network. In the example shown in FIG. 1, the two options are shown (SMLC 26 integrated into a BSC 21, and an autonomous SMLC 26 which communicates with the BSS via an interface referred to as Lb). Location methods and the location service architecture for the GERAN network are described in technical specification 3GPP TS 43.059, "Technical Specification Group GSM/EDGE Radio Access Network; Functional stage 2 description of Location Services (LCS) in GERAN (Release 6)", version 6.0.0, published by the 3GPP in April 2003.

The aforementioned different location strategies do not offer the same performance, and meet different needs. The timing advance or cell ID methods are based on the determination of the serving base station of a given mobile station whose geographical coverage provides a first approximation of the station location. This method, which is advantageous by virtue of its simplicity, obviously lacks precision for certain applications. The GPS method can only be used with mobile stations which are equipped with receivers capable of receiving GPS signals. Its practical implementation further requires the supply of specific data, known as GPS assistance data, by the network infrastructure to the mobile station, in order to improve significantly the performance of the GPRS receiver installed in the mobile station.

The TOA ("Time of Arrival") or TDOA ("Time Difference of Arrival") location methods entail a measurement of the arrival time of the received signals. The presence of multipath propagation limits the accuracy with which the time of arrival of the first received signal component can be estimated. This has a significant impact on the performance of the entities responsible for calculating the location of the mobile stations in the network, and imposes a compromise between service accuracy and processing time.

The known methods for estimating the time of arrival of signals are based on the training sequence conventionally comprising bits known a priori to the receiver.

An object of the present invention is to propose methods for estimating the time of arrival of signals which offer improved performance while being particularly suitable for implementation in the context of the location of the mobile stations of a radiocommunication network.

SUMMARY OF THE INVENTION

The invention thus proposes a method for measuring the time of arrival at a radiocommunication receiver of a received radio signal, wherein a component of the radio signal received by said receiver and carrying information bits is stored in a memory of a radiocommunication receiver, and an estimation of said information bits is obtained. The obtaining of said estimation comprises demodulating said signal component in the receiver. The time of arrival of the signal is estimated in the receiver on the basis of the estimated bits and the received signal component.

The method according to the invention uses not only pilot bits of a training sequence, but also samples of a received signal component, including bits not known in advance and estimated by the receiver. The algorithm for estimating the time of arrival of the received signal may also work with a received signal component which is significantly larger than a training sequence, enabling optimisation of the performance achieved in terms of processing time and accuracy of results. The samples do not need to be transmitted to a location centre which is separate from the receiver. Their processing is essentially local.

Another aspect of the present invention relates to a method for locating a radiocommunication mobile station wherein measurements of the times of arrival at radiocommunication receivers of radio signals transmitted by the mobile station are carried out using a method of the type outlined above, and the measured times of arrival are processed in order to estimate a location of the mobile station.

Another aspect of the present invention relates to a radiocommunication receiver comprising: a memory to store a radio signal component originating from a transmitting station and carrying information bits; means for obtaining an estimation of said information bits, including a demodulator to which said signal component is applied; and means for estimating the time of arrival of the signal on the basis of the estimated bits and the received signal component.

The invention further proposes a system for locating a radiocommunication mobile station, comprising receivers of the type defined above and means for processing the estimated times of arrival in said receivers in order to estimate a location of the mobile station.

DESCRIPTION OF PREFERRED EMBODIMENTS

In the present description, the invention will be described more specifically in its non-limiting application to the architecture of the location function according to the U-TDOA method in a GERAN-type network.

The U-TDOA method is based on measurements by the GERAN network of the time of arrival (TOA) of a known signal transmitted by a mobile station and received by a plurality of LMUs. This method requires a sufficient and rational deployment of LMUs in order to guarantee the presence of LMUs in relative proximity to the mobile stations which can be located in order to measure with accuracy the time of arrival of the signals. Since the geographical coordinates of the LMUs deployed are known to the network, the position of the mobile station can be calculated using a hyperbolic trilateration method.

GERAN networks use two types of modulation:
  a binary modulation of the GMSK ("Gaussian Minimum Shift Keying") type similar to that used in conventional GSM networks, wherein each input signal is one bit (M=2 possible values); and
  An octal modulation of the 8-PSK type (eight-state "Phase Shift Keying") type, sometimes referred to as EDGE ("Enhanced Data for GSM Evolution"), wherein each input signal is a triplet of bits (M'=$2^3$=8 possible values).

In some control channels and traffic channels of the GERAN networks, the radio signal is transmitted in the form of successive bursts produced by modulating respective blocks, each composed of 26 bits known a priori, which form a training sequence TS, 116 information bits, including 2 signalling bits SB (pre-emption flags) and two times 3 tail bits.

The type of physical channel from which a burst originates is defined on the basis (i) of signalling exchanged in advance between the transmitter and the receiver in order to define the resource type, (ii) the type of modulation used (GMSK or 8-PSK), and (iii) patterns of signalling bits SB inserted in the transmitted frames.

An LMU (25a, 25b) carries out measurements of the time of arrival of signals transmitted by the mobile station 23, and transmits these measurements to the SMLC which calculates the geographical position of the transmitting station. The other functions of the LMU are described in paragraph 5.5.4 of the aforementioned specification 3GPP TS 43.059, incorporated into the present text by reference.

Figure 2:
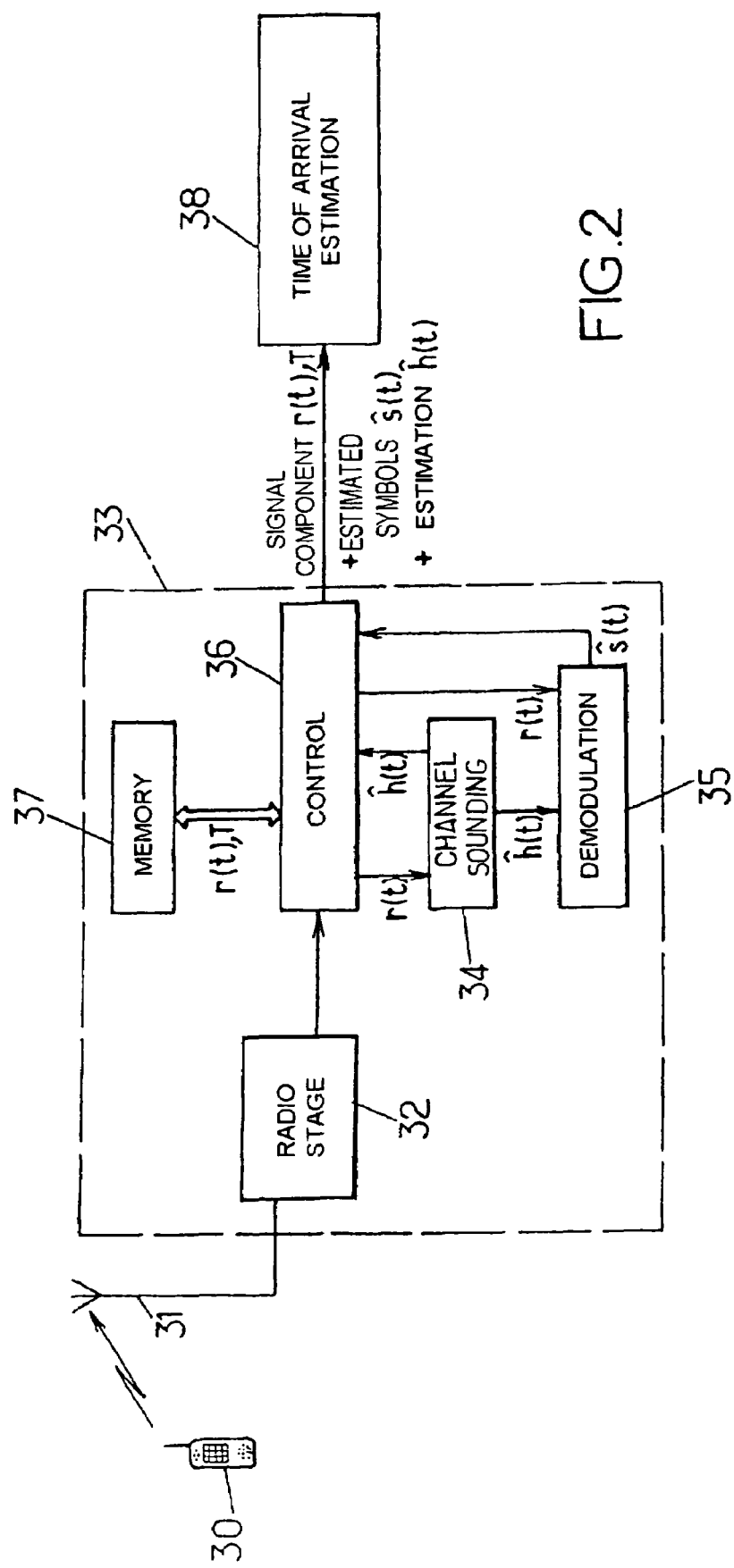
FIG. 2 is a diagram illustrating a possible LMU architecture.

FIG. 2 illustrates the possible architecture of an LMU according to the invention. The LMU shown in FIG. 2 comprises a receiver device (31, 33) which comprises a radio stage 32 which receives the radio signal received by the antenna 31 and transposes it to a lower frequency. The resulting signal is digitised by an analogy-digital converter and is then supplied to a receive filter. This receive filter performs filtering adapted to the shaping of the signals by the transmitter. It delivers a digital signal r(t) which is supplied at the input of a controller 36 which controls a demodulator 35. The demodulator 35 supplies estimations ŝ(t) of the bits transmitted by the mobile station 30. This demodulator may be a coherent demodulator which operates with a preliminary approximation of the impulse response of the radio propagation channel carried out by a channel sounding module 34. In this example, the controller 36 further controls a sounding module 34 in order to estimate the impulse response of the propagation channel comprising, in a conventional manner, a filter matched to the transmitted sequence of pilot bits concerned. On the basis of the estimated impulse response ĥ(t), the module 35 then performs coherent demodulation and decoding of the signals received on the antenna 31.

The samples of a signal component of each received burst are further stored by the controller 36 in a memory 37 in order to be transmitted subsequently to the module 38 which estimates the time of arrival of the burst. This storage operation is preferably carried out in a time-stamped manner, in the sense that it stores, along with the samples, a date indication taken relative to a time reference within the system. The signal component samples are thus transmitted to the channel sounding module 34 and to the demodulation module 35 which produces the corresponding bit estimations.

When the bits ŝ(t) carried by the decoded received signal component are available at the output of the demodulator 35, the controller 36 transmits them together with the corresponding samples and their time stamp, and also, where applicable, the estimated impulse response ĥ(t), to a module 38 which estimates the time of arrival of the received signal, which measures the time of arrival on the basis of the decoded bits, the corresponding samples and their time stamp. According to the invention, the signal component is not limited to samples corresponding to pilot bits, which are bits known a priori to the receiver 33. The module which estimates the time of arrival of the burst may thus process up to 148 information bits (and not simply the 26 pilot bits), thereby producing a significant processing gain.

Figure 3:
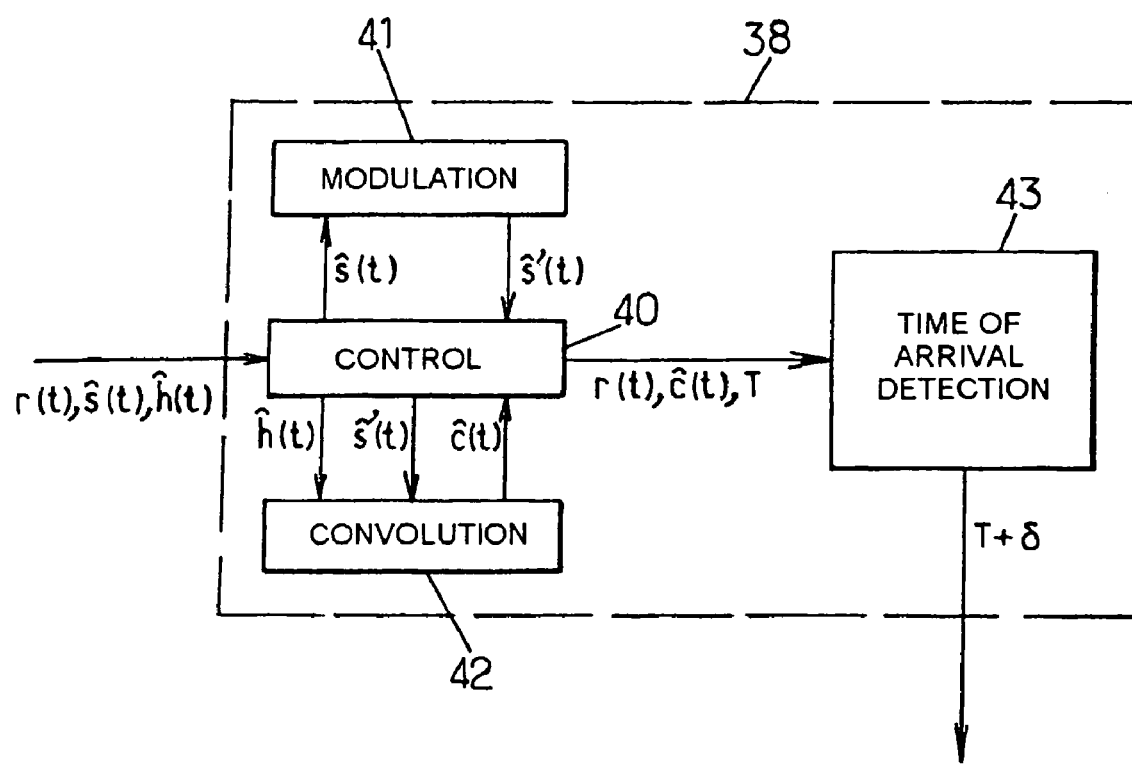
FIG. 3 is a diagram illustrating the possible architecture of a module for estimating the time of arrival of a signal.

The measurement of the time of arrival of the received signal is performed by the estimation module 38 using known methods. FIG. 3 shows a typical architecture of this module according to a cross-correlation method known per se. Another, more precise, method is described in European patent application no 1 084 547. As described above, the signal component r(t) and its time stamp T, the sequence of estimated bits ŝ(t) and the estimated impulse response ĥ(t) are supplied by the receiver 33 at the input of a controller 40 of module 38, which controls the different functions 41-43 of the module. The controller 40 transmits the sequence ŝ(t) of estimated bits to the modulation module 41. This module produces a sequence ŝ'(t) which results from the GMSK or, where applicable, 8PSK modulation of the estimated bit sequence ŝ(t), and returns the modulated sequence to the controller 40. The controller 40 then transmits it to the convolution module 42 which performs the convolution of the sequence ŝ'(t) with the estimated impulse response ĥ(t) of the channel and returns the recorded result ĉ(t): ĉ(t)=ŝ'(t)*ĥ(t) to controller 40. The product ĉ(t) is then transmitted along with the signal component r(t) and its time stamp T to the time of arrival detection module 43. This module determines the time stamp T+δ corresponding to the maximum cross-correlation between the signal component r(t) and the convolution product ĉ(t).

The fact that the method for estimating the time of arrival, and more specifically the calculation of the cross-correlation in the preceding example, are applied according to the invention to signal portions which are longer than the training sequence alone (and can, for example, as indicated below, be applied to the 148 bits of a GSM "burst", compared with the 26 bits of the training sequence), yields improved accuracy due to the fact that the maximum cross-correlation function occurs in the form of a more pointed peak, which is therefore easier to locate in time. This maximum corresponds to a time shift δ, the accuracy of which depends on the calculation granularity of the discrete cross-correlation function over the observed interval concerned, and which corrects the initial time stamp T.

The invention applies equally to other radiocommunication systems, such as CDMA ("Code Division Multiple Access") systems. In a spread-spectrum CDMA system, the transmitted bits, which are generally binary (±1) or quaternary (±1±j), are multiplied by spreading codes composed of samples, referred to as "chips", the rate of which is higher than the bit rate. Orthogonal or quasi-orthogonal spreading codes are allocated to different logical channels sharing the same carrier frequency in order to enable each receiver to detect the sequence of bits intended for it by multiplying the received signal by the corresponding spreading code.

The antenna (31) of an LMU will then, for example, be connected in receive mode via a radio stage 32 to a conventional receiver which carries out coherent demodulation based on an approximation of the impulse response of the radio propagation channel. To estimate an impulse response, the channel sounding module 34 comprises, in a conventional manner, a filter matched to the channel spreading code or to the transmitted sequence of pilot bits concerned. During the reception of a pilot bit, known a priori to the receiver 33, the output of the matched filter is multiplied by the conjugated complex of this pilot bit, which produces an observation of the impulse response. The estimation is obtained by averaging these observations over several tens of pilot bits.

On the basis of this estimated impulse response, the demodulation module 35 carries out coherent demodulation and decoding of a signal component received on the antenna 31. The demodulation may, for example, be carried out by means of a Rake-type receiver. The resulting estimations of the transmitted bits may then possibly be combined in order to obtain a diversity gain. As described above, the resulting estimation of the bits carried by the received signal component is then transmitted with the samples corresponding to a module 38 which estimates the time of arrival of the signal.

Figure 1:
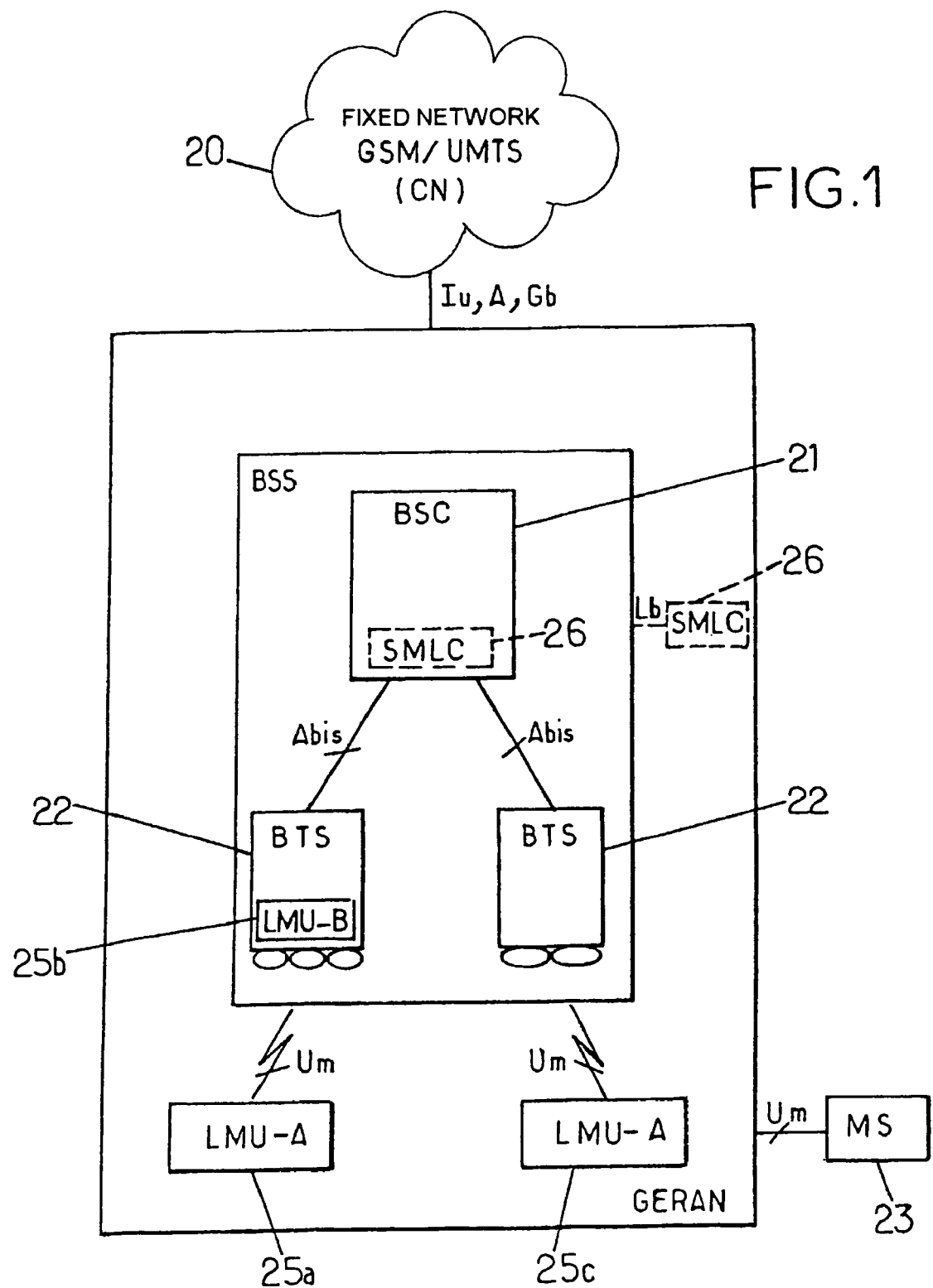
FIG. 1 is a diagram of a GERAN network.

In a second embodiment of the invention, in which a plurality of LMUs receive different versions of the same signal transmitted by a mobile station, the receive diversity gain is used to further improve the time of arrival estimation. This example is shown in FIG. 1. It is assumed that each LMU 25a, 25b, 25c receives a version of the same burst transmitted by the mobile station 23. Each LMU 25a, 25b, 25c performs the processing described above in order to obtain a first estimation of the bits carried by a component of the received signal version. The signal component is determined in the same way by each LMU, i.e. for each version it carries the received bits corresponding to the same transmitted bit sequence. The first estimations of the bits are transmitted by the LMUs which generated them to the SMLC 26, on the Um (for the remote LMUs 25a, 25c) and Abis interfaces, and then, if applicable, on the Lb interface. The SMLC 26 may then combine these first estimations in a manner known per se. If the first estimations are softbits, the combination may be carried out in particular according to the MRC ("Maximum Ratio Combining") method, which weights the different estimations according to the complex amplitudes observed for the different propagation paths to each LMU 25a, 25b, 25c. If the first estimations are hardbits, the combination may be carried out by selecting the first estimations produced by the LMU which receives the signal with the most energy, by majority vote, etc. In return, the SMLC 26 transmits the estimation produced by the combination to one or more of the LMUs 25a, 25b, 25c, which supplies it to its module 26 which estimates the time of arrival of the received signal with the corresponding signal samples.

Alternatively, if the first estimations are softbits, each LMU 25a, 25b, 25c transmits its first estimation at the request of the SMLC 26. In this example, a particularly reliable estimation produced by an LMU 25a may be judged sufficiently accurate, given the softbits, to dispense with the combination with other estimations produced by the other LMUs 25b, 25c. The SMLC 26 will then no longer require these other estimations, and in return will transmit the estimation judged to be sufficient instead of an estimation produced by the combination. This last method will prevent any overloading of the interface between the SMLC 26 and the LMUs 25a, 25b, 25c.

The invention claimed is:

1. Method for measuring the time of arrival of a radio signal originating from a transmitting station, the method comprising the steps of:
    storing in a memory of a radiocommunication receiver a component of the radio signal received by said receiver and carrying information bits and pilot bits;
    obtaining an estimation of said information bits, the obtaining of said estimation comprising a demodulation of said signal component by the receiver using said pilot bits;
    estimating in the receiver the time of arrival of the signal on the basis of the estimated bits and the received signal component,
wherein the step of obtaining the estimation of the information bits includes combining a plurality of estimations of identical information bits and comprises the steps of:
    demodulating said signal component in a plurality of receivers, each receiving said component, to generate first estimations of information bits;
    addressing first estimations of the information bits to a computing unit; and combining the first estimations to produce a second estimation of the information bits, whereby estimating the time of arrival of the signal uses said second estimation of the information bits.

2. Method according to claim 1, wherein the step of obtaining an estimation of the information bits carried by said signal component comprises estimating an impulse response of a channel for transmitting the signal between the transmitting station and at least one receiver of the plurality of receivers.

3. Method according to claim 1, wherein the step of estimating the time of arrival of the signal comprises remodulating the estimated bits in order to generate a remodulated signal.

4. Method for measuring the time of arrival of a radio signal originating from a transmitting station, the method comprising the steps of:

storing in a memory of a radiocommunication receiver a component of the radio signal received by said receiver and carrying information bits and pilot bits;

obtaining an estimation of said information bits, the obtaining of said estimation comprising a demodulation of said signal component by the receiver using said pilot bits; and estimating in the receiver the time of arrival of the signal on the basis of the estimated bits and the received signal component, wherein the step of estimating in the receiver the time of arrival of the signal comprises remodulating the estimated bits in order to generate a remodulated signal, and wherein the step of estimating in the receiver the time of arrival of the signal further comprises producing a synthesized version of the received signal component through convolution of the remodulated signal and an estimated impulse response of a channel for transmitting the signal between the transmitting station and said receiver.

5. Method according to claim 4, wherein the step of estimating in the receiver the time of arrival of the signal further comprises maximizing a correlation between the received signal component and the synthesized version of said component.

6. Method for locating a radiocommunication mobile station, comprising the steps of:

carrying out measurements of times of arrival at radiocommunication receivers of radio signals transmitted by the mobile station; and processing the measured times of arrival to estimate a location of the mobile station, wherein the step of carrying out measurements of times of arrival at one of said receivers comprises the steps of:

storing in a memory of said one of the receivers a component of a radio signal received from said mobile station and carrying information bits and pilot bits;

obtaining an estimation of said information bits, the obtaining of said estimation comprising a demodulation of said signal component using said pilot bits; and estimating the time of arrival of the signal on the basis of the estimated bits and the received signal components, wherein the step of obtaining the estimation of the information bits includes combining a plurality of estimations of identical information bits and comprises the steps of:

demodulating said signal component in a plurality of receivers, each receiving said component, to generate first estimations of information bits;

addressing first estimations of the information bits to a computing unit; and combining the first estimations to produce a second estimation of the information bits, whereby estimating the time of arrival of the signal uses said second estimation of the information bits.

7. Method according to claim 6, wherein the step of obtaining an estimation of the information bits carried by said signal component comprises estimating an impulse response of a channel for transmitting the signal between the mobile station and said one of the receivers.

8. Method according to claim 6, wherein the step of estimating the time of arrival of the signal comprises remodulating the estimated bits in order to generate a remodulated signal.

9. Method for locating a radiocommunication mobile station, comprising the steps of:

carrying out measurements of times of arrival at radiocommunication receivers of radio signals transmitted by the mobile station; and processing the measured times of arrival to estimate a location of the mobile station, wherein the step of carrying our measurements of times of arrival at one of said receivers comprises the steps of:

storing in a memory of said one of the receivers a component of a radio signal received from said mobile station and carrying information bits and pilot bits;

obtaining an estimation of said information bits, the obtaining of said estimation comprising a demodulation of said signal component using said pilot bits; and estimating the time of arrival of the signal on the basis of the estimated bits and the received signal component, wherein the step of estimating the time of arrival of the signal comprises remodulating the estimated bits in order to generate a remodulated signal, and wherein the step of estimating the time of arrival of the signal further comprises producing a synthesized version of the received signal component through convolution of the remodulated signal and an estimated impulse response of a channel for transmitting the signal between the mobile station and said one of the receivers.

10. Method according to claim 9, wherein the step of estimating the time of arrival of the signal further comprises maximizing a correlation between the received signal component and the synthesized version of said component.

11. Radiocommunication receiver, comprising:

a memory to store a radio signal component originating from a transmitting station and carrying information bits and pilot bits;

means for obtaining an estimation of said information bits, including a demodulator to which said signal component is applied and which uses said pilot bits; and means for estimating a time of arrival of the signal on the basis of the estimated bits and the received signal component, wherein the means for obtaining an estimation of the information bits carried by said signal component comprise:

means for addressing to a computing unit a first estimation of the information bits, produced by the demodulator, the computing unit being suitable for combining the first estimations originating from multiple receivers and a second estimation of information bits; and means for receiving said second estimation of information bits from the computing unit.

12. Receiver according to claim 11, wherein the means for obtaining an estimation of the information bits carried by said signal component comprise means for estimating an impulse response of a channel for transmitting the signal between the transmitting station and said receiver.

13. Receiver according to claim 11, wherein the means for estimating the time of arrival of the signal comprise means for remodulating the estimated bits to generate a remodulated signal.

14. Radiocommunication receiver, comprising:
- a memory to store a radio signal component originating from a transmitting station and carrying information bits and pilot bits;
- means for obtaining an estimation of said information bits, including a demodulator to which said signal component is applied and which uses said pilot bits; and
- means for estimating a time of arrival of the signal on the basis of the estimated bits and the received signal component, wherein the means for estimating the time of arrival of the signal comprise means for remodulating the estimated bits to generate a remodulated signal, and
wherein the means for estimating the time of arrival of the signal further comprise means for producing a synthesized version of the received signal component through convolution of the remodulated signal and an estimated impulse response of a channel for transmitting the signal between the transmitting station and said receiver.

15. Receiver according to claim 14, wherein the means for estimating the time of arrival of the signal further comprise means for maximizing a correlation between the received signal component and the synthesized version of said component.

16. System for locating at radiocommunication mobile station, comprising a plurality of radiocommunication receivers and means for processing times of arrival, estimated in said receivers, of a radio signal originating from said mobile station to estimate a location of said mobile station, wherein at least one of said plurality of receivers comprises:
- a memory to store a radio signal component originating from the mobile station and carrying information bits and pilot bits;
- means for obtaining an estimation of said information bits, including a demodulator to which said signal component is applied and which uses said pilot bits; and
- means for estimating a time of arrival of the signal on the basis of the estimated bits and the received signal components, wherein the means for obtaining an estimation of the information bits carried by said signal component comprise:
- means for addressing to a computing unit a first estimation of the information bits, produced by the demodulator, the computing unit being suitable for combining the first estimations originating from multiple receivers of said plurality of receivers and a second estimation of information bits; and
- means for receiving said second estimation of information bits from the computing unit.

17. System according to claim 16, wherein the means for obtaining an estimation of the information bits carried by said signal component comprise means for estimating an impulse response of a channel for transmitting the signal between the transmitting station and said one of said plurality of receivers.

18. System according to claim 16, wherein the means for estimating the time of arrival of the signal comprise means for remodulating the estimated bits to generate a remodulated signal.

19. System for locating a radiocommunication mobile station, comprising a plurality of radiocommunication receivers and means for processing times of arrival, estimated in said receivers, of a radio signal originating from said mobile station to estimate a location of said mobile station, wherein at least one of said plurality of receivers comprises:
- a memory to store a radio signal component originating from the mobile station and carrying information bits and pilot bits;
- means for obtaining an estimation of said information bits, including a demodulator to which said signal component is applied and which uses said pilot bits; and
- means for estimating a time of arrival of the signal on the basis of the estimated bits and the received signal component, wherein the means for estimating the time of arrival of the signal comprise means for remodulating the estimated bits to generate a remodulated signal, and
wherein the means for estimating the time of arrival of the signal further comprise means for producing a synthesized version of the received signal component through convolution of the remodulated signal and an estimated impulse response of a channel for transmitting the signal between the mobile station and said one of said plurality of receivers.

20. System according to claim 19, wherein the means for estimating the time of arrival of the signal further comprise means for maximizing a correlation between the received signal component and the synthesized version of said component.

* * * * *

UNITED STATES PATENT AND TRADEMARK OFFICE
CERTIFICATE OF CORRECTION

PATENT NO. : 7,317,933 B2
APPLICATION NO. : 10/878501
DATED : January 8, 2008
INVENTOR(S) : Nidham Ben Rached and Thierry Lucidarme It is certified that error appears in the above-identified patent and that said Letters Patent is hereby corrected as shown below:

Column 7:
Line 59, "components" should be --component--.

Column 8:
Line 22, "our" should be --out--.

Column 9:
Line 32, "at" should be --a--;
Line 48, "components" should be --component--.

Signed and Sealed this

Sixth Day of May, 2008

JON W. DUDAS
*Director of the United States Patent and Trademark Office*